(12) United States Patent
Rajoria

(10) Patent No.: US 6,517,796 B1
(45) Date of Patent: Feb. 11, 2003

(54) PREPARATION AND PURIFICATION OF DIBORANE

(75) Inventor: Dalbir S. Rajoria, Glen Gardner, NJ (US)

(73) Assignee: Honeywell Intellectual Properties Inc., Tempe, AZ (US)

( * ) Notice: Subject to any disclaimer, the term of this patent is extended or adjusted under 35 U.S.C. 154(b) by 119 days.

(21) Appl. No.: 09/662,015

(22) Filed: Sep. 14, 2000

Related U.S. Application Data

(62) Division of application No. 09/288,931, filed on Apr. 9, 1999.
(60) Provisional application No. 60/081,249, filed on Apr. 9, 1998.

(51) Int. Cl.$^7$ ................................................. C01B 6/10
(52) U.S. Cl. ................... 423/295; 423/294; 423/240 S; 423/293
(58) Field of Search ................................ 423/294, 295, 423/293, 296, 240; 96/108

(56) References Cited

U.S. PATENT DOCUMENTS

| | | | |
|---|---|---|---|
| 2,994,586 A | 8/1961 | Huff | 423/294 |
| 4,298,587 A | 11/1981 | Kapur | 423/350 |
| 4,376,734 A | * 3/1983 | Torelli et al. | 552/521 |
| 4,388,284 A | * 6/1983 | Shore et al. | 423/295 |
| 4,457,901 A | 7/1984 | Kitsugi et al. | 423/341 |
| 4,520,006 A | 5/1985 | Laviron et al. | 423/531 |
| 4,535,072 A | 8/1985 | Kitayama et al. | 502/411 |
| 4,714,604 A | 12/1987 | Olson | 423/488 |
| 4,943,423 A | 7/1990 | Evans et al. | 423/293 |
| 4,976,942 A | 12/1990 | Kitahara et al. | 423/294 |
| 5,213,767 A | 5/1993 | Smith et al. | 422/177 |
| 5,242,670 A | 9/1993 | Gehringer | 423/342 |
| 5,371,052 A | 12/1994 | Kawamura et al. | 502/20 |
| 5,378,444 A | 1/1995 | Akita et al. | 423/240 S |
| 5,670,445 A | 9/1997 | Kitahara et al. | 502/406 |
| 5,705,727 A | 1/1998 | Holub et al. | 585/525 |
| 5,846,429 A | 12/1998 | Shimizu et al. | 210/670 |
| 5,882,615 A | 3/1999 | Fukuda et al. | 423/240 S |

FOREIGN PATENT DOCUMENTS

| | | | |
|---|---|---|---|
| EP | 0 662 339 A2 | 7/1995 | |
| EP | 0 742 191 A2 | 11/1996 | |
| JP | 63-152519 | 7/1987 | 423/240 S |
| JP | 63-156537 | 6/1988 | 423/240 S |
| JP | 3-40901 | 2/1991 | |
| JP | 63-319945 | 11/1994 | 423/240 S |
| WO | WO 99/52817 | 10/1999 | |

OTHER PUBLICATIONS

The Merck Index, Ninth Edition, 1976 (no month), p. 214 and p. 1107.
The Chemistry of Boron and its Compounds, Earl L. Muetterties, 1967 (no month, pp. 246–257.
124:320332 CA, Method and apparatus for preventing hindrance of stable pressure–regulating function of valve in supply of diborane–containing gas mixture, Inventors: Adachi, Fujio; Nakanishi, Ryuichi, Abstract of JP 08075097 Dated: Mar. 19, 1996.
122:149471 CA, Process and composition for purifying semiconductor process gases to remove Lewis acid and oxidant impurities, Inventors: Tom, Glenn M.; McManus, James V., Abstract of WO 9501409 Dated: Jan. 12, 1995.
116:87053 CA, Physicochemical principles of high–degree purification of volatile inorganic hydrides by fractional distillation at elevated pressures. II. Temperature dependence of the separation factor of a fractionating column from the boiling point (Tb) to 0.8 times the critical temperature (Tc). Authors: Vorotyntsev, V.M.; Mochalov, G.M.; Balabanov, V.V., Vysokochist. Veshchestva (1991), (6), 126–30, Journal, Russian (Abstract) No month.
115:259370 CA, Purification of diborane, Inventors: Tsuchiya, Hiroo; Otsuji, Akira, Abstract of JP 03197301 Dated Aug. 28, 1991.
115:74671 CA, Purification of hydride gas, Inventors: Kitahara, Koichi; Shimada, Takashi; Iwata Keiichi, Abstract of JP 03075202 Dated Mar. 29, 1991.
115:11795 CA, Purification of gaseous hydrides, Inventors: Kitahara, Koichi: Shimada, Takashi; Iwata, Keiichi, Abstract of JP 03040901 Dated Feb. 21, 1991.
114:219600 CA, Purification of hydride gases, Kitahara, Koichi; Shimada, Takashi; Iwata, Keiichi, Abstract of JP 03012304 Dated Jan. 21, 1991.
114:219599 CA, Purification of hydride gases, Inventors: Kitahara, Koichi; Shimada, Takashi; Iwata, Keiichi, Abstract of JP 03012303 Dated Jan. 21, 1991.
114:46026 CA, Purification of hydride gas useful for semiconductor preparation, Inventors: Kitahara, Koichi; Shimada, Takashi; Iwata, Keiichi, Abstract of JP 02204306 Dated Aug. 14, 1990.
81:5036 CA, Separation of compounds using zeolites, Inventors: Yatsurugi, Yoshifumi; Kuratomi, Tatsuo; Takaishi, Tetsuo, Abstract of DE 2264512 Dated Jan. 24, 1974.
72:22900 CA, Ultrapurification of diborane by low–temperature fractional distillation, Authors: Zorin, A.D.; Kedyarkin, V.M.; Stepanov, V.M.; Kuznetsova, T.S.; Martynova, N.A., Tr. Khim. Khim. Tekhnol. (1968), (3), 103–7 (no month), Journal, Russian, Abstract.
68:8902 CA, Attempt at separating mixtures of boron chloride, dichloromonoborane, and diborane. Application to the purification of diborane and the conversion of dichloromonoborane, Authors: Cueilleron, Jean; Bouix, Jean, Bull. Soc. Chim. Fr. (1967), (9), 3526–9 (no month), Journal, French, Abstract.

* cited by examiner

*Primary Examiner*—Ngoc–Yen Nguyen
(74) *Attorney, Agent, or Firm*—Colleen D. Szuch

(57) ABSTRACT

$BF_3$, $CO_2$ or both are removed from a mixture containing these gases with $B_2H_6$ by contacting the mixture with an inorganic hydroxide such as LiOH. $B_2H_6$ is synthesized by contacting $BF_3$ with $KBH_4$.

11 Claims, 3 Drawing Sheets

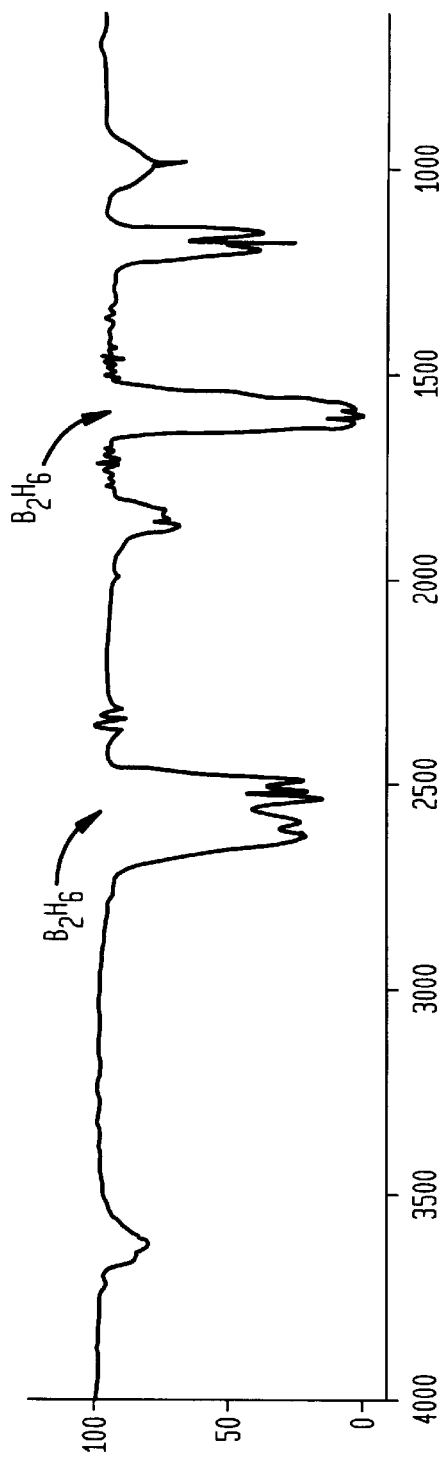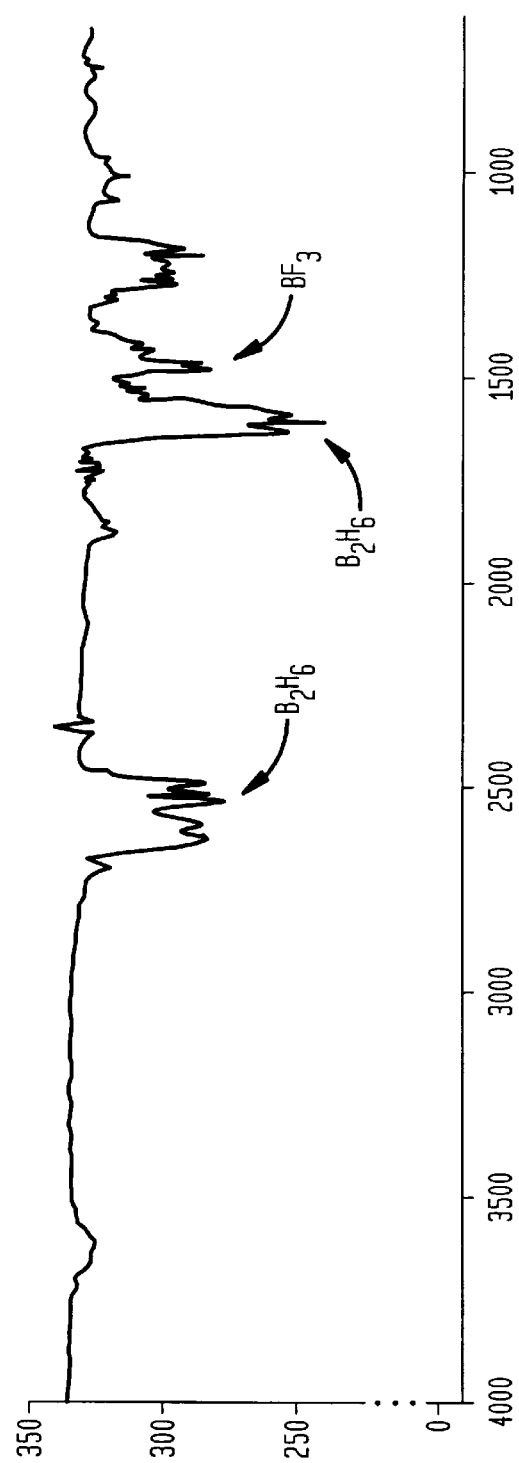
FIG. 2A
FIG. 2B

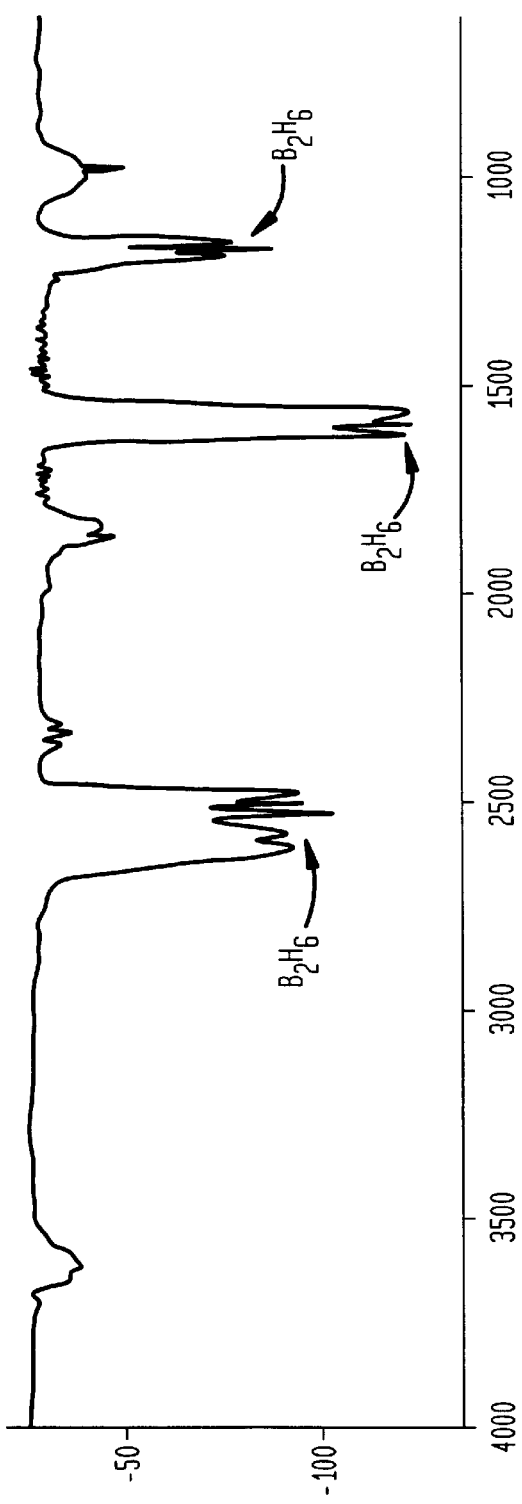
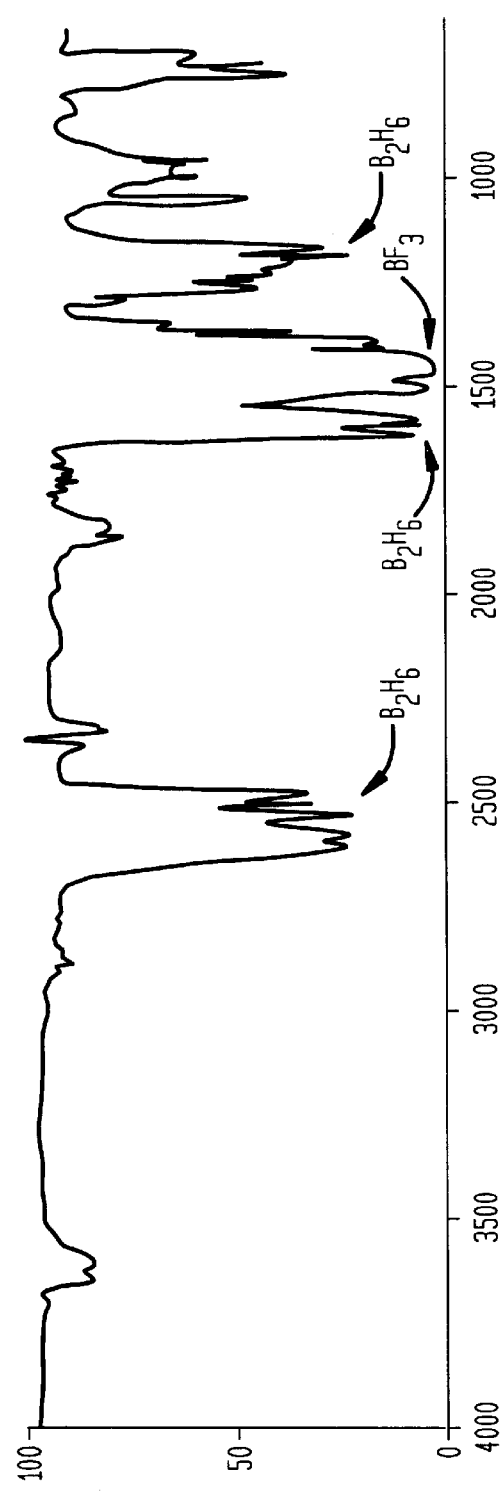
FIG. 3A
FIG. 3B

PREPARATION AND PURIFICATION OF DIBORANE

CROSS-REFERENCE TO RELATED APPLICATIONS

The present application is a divisional application of copending application Ser. No. 09/288,931 filed on Apr. 9, 1999, which claims the benefit of U.S. Provisional Patent Application 60/081,249, filed Apr. 9, 1998.

BACKGROUND OF THE INVENTION

The present invention relates to production and purification of diborane. Diborane ($B_2H_6$) is a flammable gas which is used as a p type dopant in semiconductors, and is also used in boron-phosphate-silicate glass forming. Diborane forms a wide variety of complexes with lewis bases such as borane-tetrahydrofuran, borane dimethyl sulfide and a variety of amine boranes. These compounds are widely used as selective reducing agents in synthesis of pharmaceuticals, fine organic chemicals and electroless metal plating baths.

At room temperature, diborane slowly decomposes to higher boranes with their physical state ranging from gaseous to solid. This causes process variations and equipment malfunctions. In order to reduce decomposition, diborane is sometimes shipped as a mixture with a blanket gas or at low temperature, such as at dry ice temperature. Another way to overcome the decomposition problem is to employ point-of-use diborane generation. However, the difficulties encountered with present synthesis and purification processes have inhibited point-of-use diborane generation.

Numerous possible methods of diborane synthesis have been published. The most typical and commercially used synthesis method is the reaction of sodium borohydride with boron trifluoride in ether solvents such as diglyme. Because this process uses highly inflammable solvents, it requires significant safety precautions. Further, diborane complexes with solvents. Such complexes make it difficult to purify the diborane.

A preferred dry process for diborane synthesis is described in U.S. Pat. No. 4,388,284. This process involves reaction of lithium or sodium borohydride with boron trifluoride ($BF_3$) in the absence of a solvent. As a preferred method, the patent describes condensing gaseous boron trifluoride at liquid nitrogen temperature onto sodium borohydride, then warming the resultant mixture to a reaction temperature of 0 to 50° C. and holding the mixture at the reaction temperature for 4 to 12 hours. The process yields a mixture containing about 95% diborane and also containing unreacted boron trifluoride. Under similar conditions, reaction of lithium borohydride with boron trifluoride is sluggish and gives poor yield.

While the dry process provides diborane free from solvent contamination, the product contains significant amount of unreacted boron trifluoride. To achieve high purity diborane, tedious distillation is required to separate the diborane from the boron trifluoride. The process is slow for commercial production and is a batch process. Based upon thermodynamic considerations, the reaction of lithium borohydride with boron trifluoride should be more favored than the comparable reaction with sodium borohydride, but the observations set forth in the '284 patent indicate that the reaction involving lithium borohydride does not work well in practice.

SUMMARY OF THE INVENTION

One aspect of the present invention provides methods for treating mixtures containing diborane and boron trihalides such as boron trifluoride by contacting the mixture with a reagent composition including one or more inorganic hydroxides. This aspect of the invention incorporates the discovery that inorganic hydroxides selectively scavenge boron trihalides, and particularly $BF_3$, from gas mixtures containing diborane. For example, the reagent composition may include one or more alkali metal hydroxides such as sodium, potassium or lithium hydroxides; alkaline earth hydroxides such as beryllium, calcium, strontium and barium hydroxides; ammonium hydroxide; and transition metal hydroxides. Mixtures of these materials may be employed. Desirably, the reagent composition includes a substantial amount of the inorganic hydroxide, i.e. more than 10%, and preferably more than 20% hydroxides. Preferably, the composition is predominantly composed of the hydroxide or hydroxides, i.e., the reagent composition contains more than 50% mole fraction hydroxides. Most preferably, the reagent composition consists essentially of the hydroxide or hydroxides. The reagent composition typically is present in solid form, such as powder, pellets, granules or a coating on an inert support such as alumina or silica. The reagent composition may be pretreated by holding it at an elevated temperature prior to use, as, for example, by baking in an inert atmosphere prior to use.

The temperature in the contacting step preferably is room temperature (about 20° C.) or below, and more preferably about 0° C. or below. Temperatures below about −20° C., and desirably below about −40° C., are even more preferred. The use of such low temperatures minimizes decomposition of diborane in the process. Most preferably, the diborane-containing mixture is in the gaseous state when contacted with the reagent composition. Therefore, the temperature in the contacting step desirably is above the boiling temperature of diborane at the pressure employed. Stated another way, the prevailing pressure in the contacting step is below the equilibrium vapor pressure of diborane at the temperature employed for the contacting step. The boiling temperature of diborane is about −92° C. at atmospheric pressure, and hence the temperature in the contacting step desirably is above about −92° C. if the contacting step is performed at about atmospheric pressure. Dry ice temperature (about −80° C.) is particularly preferred.

The time of contact between the mixture and the reagent composition may be a few seconds to a few hours, although very short contact times of a few seconds are more preferred. The contacting step can be performed batchwise or, preferably, on a continuous basis, by passing the mixture continuously through a vessel containing the reagent composition. The flow rate through the vessel, and the proportions of the vessel and amount of reagent composition can be selected to provide any desired contact time. Desirably, the purifying process, and particularly the contacting step, are performed at a location where the purified diborane is to be used, and the diborane is purified about 4 hours or less before it is used. Most preferably, the diborane is purified immediately before it is used.

Although this aspect of the invention has been summarized above in connection with purification of diborane, the process also can be applied to purification of other inorganic hydrides, and removal of inorganic halides other than boron trihalides such as $BF_3$. Thus, process is applicable to remove inorganic halides from inorganic hydrides selected from the group consisting of diborane, silane ($SiH_4$), germane ($GeH_4$), phosphine ($PH_3$), arsine ($AsH_3$), stibine ($SbH_3$) and mixtures thereof. Desirably, the inorganic halides which is or are removed are selected from the group consisting of $BF_3$, $SiF_4$, $GeF_4$, $PF_3$, $PF_5$, $AsF_3$, $AsF_5$, $SbF_3$, $SbF_5$ and mixtures thereof.

A further aspect of the invention includes the realization that contacting the diborane-containing mixture with a hydroxide-containing reagent mixture will also serve to remove carbon dioxide if carbon dioxide is present in the mixture. Thus, processes according to this aspect of the invention include the steps of contacting a mixture containing diborane or other inorganic hydride as discussed above and carbon dioxide with a hydroxide-containing reagent. The process conditions may be as discussed above in connection with removal of halides. Where the gas mixture contains both halides and carbon dioxide, both can be removed in a single contacting step.

Yet another aspect of the invention provides methods of synthesizing diborane comprising reacting a borohydride reactant including potassium borohydride ($KBH_4$) with a boron trihalide, most preferably $BF_3$, to thereby form a reaction product. The reaction desirably is performed at a reaction temperature of about −130° C. to about 20° C. The reactant desirably includes at least 20% potassium borohydride, and preferably consists essentially of potassium borohydride or includes potassium borohydride together with sodium borohydride ($NaBH_4$). The reacting step desirably is performed in the absence of a solvent and thus is referred to herein as a "dry" process. The reaction desirably is performed by continuously passing the boron trihalide, in gaseous form, as by passing the boron trihalide through a vessel containing the borohydride reactant in solid form. The reaction can also be performed in batchwise fashion, as by condensing the borohalide on the reactant in a vessel and then warming the vessel, reactant and borohalide. This aspect of the invention incorporates the realization that higher conversion of boron trifluoride to diborane is achieved by reacting it with potassium borohydride than with either lithium or sodium borohydride. The reaction with potassium borohydride is especially favored at the preferred temperatures of about −130 to about 20° C. Most desirably, the reaction conditions are selected so that liquid $BF_3$ is present in contact with the borohydride reactant during at least part of the reaction. Thus, $BF_3$ desirably condenses on the borohydride reagent.

Still further aspects of the invention provide apparatus for performing the processes discussed above. Thus, one aspect of the invention provides a purifier to selectively scavenge inorganic halides such as $BF_3$ and carbon dioxide from diborane-containing or other inorganic hydride mixtures, and also provides a diborane generation system including such a purifier. Another aspect of the invention provides a generator for making diborane using the potassium borohydride reaction discussed above, which may also include a purifier as discussed above. Apparatus according to these aspects of the invention may be installed at the point of use, and desirably is connected directly to diborane-using process equipment for continuous or batchwise transfer of the diborane made or purified in the apparatus into the diborane-using equipment.

BRIEF DESCRIPTION OF THE DRAWINGS

FIG. 2b is an infrared spectrum of a mixture including diborane and $BF_3$.

FIG. 2a is an infrared spectrum of the mixture of FIG. 2b after purification in accordance with one embodiment of the invention.

FIG. 3b is an infrared spectrum of a another mixture including diborane and $BF_3$.

FIG. 3a is an infrared spectrum of the mixture of FIG. 3b after purification in accordance with another embodiment of the invention.

DETAILED DESCRIPTION OF THE PREFERRED EMBODIMENTS

Figure 1:
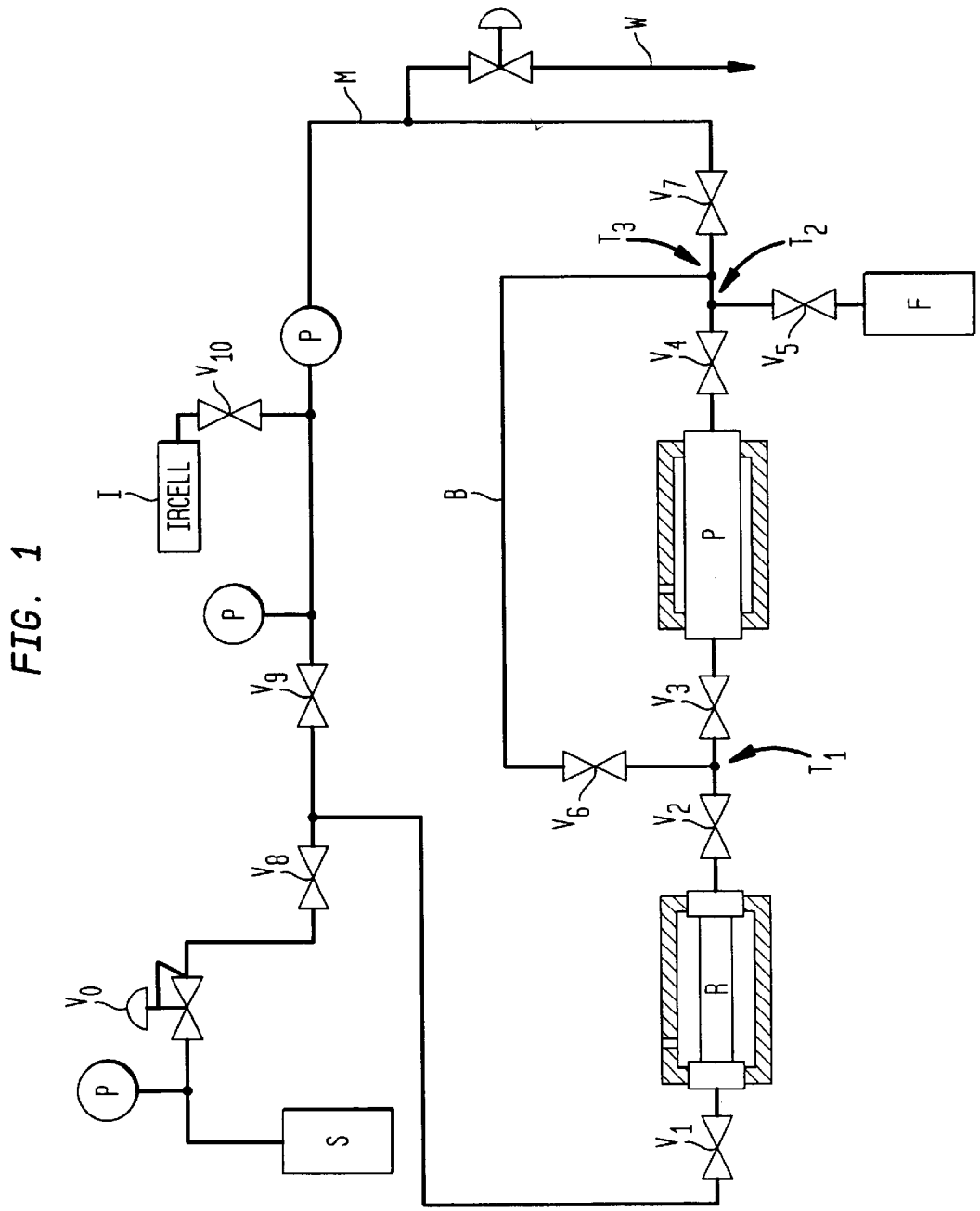
FIG. 1 is a diagram of apparatus in accordance with one embodiment of the invention.

Apparatus according to one embodiment of the invention includes a vacuum tight stainless steel closed system. A gas cylinder S having a pressure regulating valve V0 is connected with a reaction cylinder R containing the borohydride reagent in solid form. Reaction cylinder R has an inlet valve V1 and an outlet valve V2 on opposite ends. The reaction cylinder is jacketed to facilitate cooling and low temperature reaction. The outlet valve V2 of cylinder R is connected to a tee T1. One branch of tee T1 is connected to a purifier cylinder or bubbler P having inlet valve V3 and outlet valve V4. The purifier cylinder contains a hydroxide reagent in solid form. The outlet valve of the purifier cylinder is connected through another tee T2 and valve V5 to a gas receiving device F. Device F may be a receiver cylinder for collecting the diborane, or may be a piece of process equipment which consumes diborane, such as a semiconductor thin film deposition system or other reactor.

A bypass valve V6 and bypass line B connects tee T1 with a further tee T3, which is connected to tee T2. The remaining branch of tee T3 is connected though a further valve V7 to a vacuum manifold M equipped with pressure and vacuum gauges. The manifold is equipped with a waste connection W, connected to a pump and waste gas scrubber. The manifold is also connected to an infrared spectrophotometer cell I, and additional valves V8, V9, and V10 are provided. Flow meters and/or controllers (not shown) may be provided at source S, at valve V3 and at other locations where desired for monitoring the process to achieve the required capacity generator. The bypass line and spectrophotometer are used for evaluation purposes in the examples set forth below; these elements, and the associated valves, can be omitted from production systems In operation, the reaction cylinder R is filled with a borohydride reactant as discussed above, and the purifier cylinder P is filled with a hydroxide-containing reagent as also discussed above. The complete system is evacuated through waste connection W and the associated pump. While reaction cylinder R is maintained at the desired reaction temperature, and while purifier P is maintained at the desired contacting temperature, gas cylinder S and pressure regulating valve V0 are operated to admit boron trifluoride into reaction cylinder R via valve V1. The $BF_3$ reacts with the borohydride in cylinder R to yield a mixture including diborane and $BF_3$. The outlet valve V2 and the purifier valves V3 and V4 remain open, so that the mixture from cylinder R passes through purifier P to form purified diborane, which passes to the collecting cylinder or using device F. Some of the purified diborane is diverted through valve V7 to manifold M and IR spectrophotometer I. To monitor the composition of the mixture from reactor R, valves V3, V4 and V5 are shut, whereas valve V6 is opened to divert the mixture around purifier P.

Using a potassium borohydride reactant in reactor R, the optimum conversion of $BF_3$ to diborane occurs at a reaction temperature of about −120 to about 30° C. When the reaction is carried out at higher temperature, a higher concentration of boron trifluoride in the diborane/boron trifluoride mixture resulting from the reaction is observed. Similarly the boron trifluoride content in the mixture is higher when sodium borohydride is used in place of potassium borohydride.

Because the hydroxide in purifier P effectively scavenges boron trifluoride from the mixture, sodium or lithium borohydride can be used in reactor R while still maintaining a high-purity diborane output from the purifier. This is less preferred because the purifier capacity is reduced. In the purifier, optimum selective scavenging is achieved with the use of lithium, sodium or potassium hydroxide. The most preferred hydroxide for the purifier is lithium hydroxide. As mentioned above, the purifier P desirably is used at below room temperature, and more preferably at dry ice temperature.

ILLUSTRATIVE EXAMPLES

The following Examples illustrate certain features of the invention:

Example 1

50 grams potassium borohydride was packed under helium atmosphere inside a glove bag into a cylindrical stainless steel reactor R (volume 195 cc) with flanges on each end. The reactor was closed with mounting flanges with valves closed. This reactor assembly was placed within a jacketed empty cylindrical container. The purifier P was a stainless steel bubbler (972 cc volume) with a dip tube, welded top with inlet and outlets valves with VCR fittings. The purifier was more than half filled through a fill port with potassium hydroxide pellets. The operation to fill the purifier was conducted inside a glove bag with helium flowing. The fill port was closed with ½" VCR cap. The reactor and purifier were connected as illustrated in FIG. 1. All sections of the set up including reactor and purifier were evacuated. The purifier P was gently heated while evacuating to dry the potassium hydroxide. The jacketed container around the reactor was filled with dry ice. The purifier was cooled using a Dewar filled with dry ice around it.

Boron trifluoride was admitted to reactor R from gas cylinder S with the pressure regulating valve regulator adjusted to maintain 1100 torr inlet pressure to the reactor. The inlet valve V1 of the reactor was closed and outlet valve V2 opened to pass a sample of the reacted mixture through purifier P. A sample passing through purifier P at an outlet pressure of 24 torr was collected in a pre-evacuated IR cell I. The IR scan was taken on Buck Scientific IR spectrophotometer. FIG. 2a shows the IR spectrum of the sample; it indicates pure diborane. The IR cell was brought back to manifold and evacuated. Both valves V3 and V4 on the purifier were closed. A further sample of the mixture from the reactor was collected in the IR cell at a pressure of 19 torr by opening the outlet valve V2 of the reactor and bypass valve V6 to the bypass line B. The IR spectrum of the sample is shown in FIG. 2b. This spectrum shows diborane and also shows absorption at 1450 cm$^{-1}$ characteristic of $BF_3$. These results indicate that the purifier has successfully removed $BF_3$ from the mixture while leaving diborane substantially intact.

Example 2

The procedure of Example 1 was substantially repeated, except that the purifier P with potassium hydroxide was kept at room temperature. A sample of passing through the purifier was collected at a pressure of 53 torr, and the IR scan was taken. The spectrum shows only small amount of diborane and no indication of $BF_3$. However another sample was collected at 14 torr through bypass line B, thus bypassing purifier P, contained diborane and some boron trifluoride; the spectrum of this sample was similar to FIG. 2b.

These results suggest that at room temperature the purifier removes boron trifluoride completely, but some disproportination of diborane occurs.

Example 3

The procedure of Example 1 is substantially repeated, except that the purifier was filled with soda lime (a mixture of sodium hydroxide, calcium oxide and calcium hydroxide). The reactor and purifier were cooled to dry ice temperature. A sample from the reactor passing through the purifier was collected at 51 torr, and another sample was collected bypassing the purifier at 19 torr. Comparison of the IR scans for these samples confirmed that purifier scrubs the boron trifluoride from the diborane/ boron trifluoride mixture. With soda lime, however, some disproportionation of diborane into non-condensable hydrogen was observed.

Comparison Example 4

Reactor R used in Example 1 was cleaned, dried and then filled with 62.4 grams of sodium borohydride and attached to the set up of FIG. 1 and to the vacuum manifold. The purifier P used in Example 1 was filled with 247 grams of lithium hydroxide. The purifier P used in Example 1 was heated to 60° C., repeatedly purged with helium and evacuated. The jacket of the reactor R and Dewar of purifier P were filled with dry ice and allowed them to cool to dry ice temperature. Boron trifluoride was admitted to the reactor at 760 torr pressure. The inlet valve V1 of the reactor was closed and the outlet valve V2 was opened to the bypass line B and manifold. A sample was collected at 50 torr was collected in the pre-evacuated IR cell. FIG. 3b shows the IR scan of the sample indicating diborane and a significantly higher content of unreacted boron trifluoride than that found in Example 1 with potassium borohydride.

Example 5

The IR cell was again evacuated and a 22.4 torr sample was collected from the reactor of Comparison Example 4 by opening the reactor outlet through purifier P. The resulting IR scan, shown in FIG. 3a, shows only diborane and shows the absence of any boron trifluoride.

Comparison Example 6

The procedure of Comparison Example 4 was substantially repeated, except that the reactor R was kept at room temperature. Boron trifluoride was opened to the reactor at 800 torr pressure and the inlet valve closed. A sample of 50 torr was collected in the IR cell, bypassing the purifier. The IR spectrum showed predominantly boron trifluoride, indicating that little if any diborane had formed.

Example 7

The procedure of Comparison Example 6 was repeated, but using a reactor containing potassium borohydride. The IR spectrum indicates significantly higher content of diborane than that achieved in Comparison Example 6.

Example 8

Conversion efficiency and diborane yield from reaction of $BF_3$ and potassium borohydride were determined. 7.75 grams (0.1437 moles) of potassium borohydride was loaded in a 75 ml stainless steel sample cylinder inside a glove bag with helium atmosphere. The cylinder was closed with a diaphragm valve and mounted on a vacuum manifold. Boron trifluoride was transferred into the cylinder and condensed therein in six different attempts. The cylinder was cooled with liquid nitrogen. The amount of boron trifluoride transferred varied from 0.01 to 0.077 moles in these attempts. Each time boron trifluoride was transferred into the sample cylinder was weighed and stored at 0° C. in a freezer. The reaction mixture present in the cylinder was analyzed at 30 torr each time by IR scan. After analysis the product was transferred and sample cylinder weighed and refilled with boron trifluoride. In each of the six attempts complete reaction yielding diborane was observed though IR scan. A total of 0.19 mole boron trifluoride completely reacted to yield diborane. In the next attempt when 0.01 mole of boron trifluoride was added and left over a week in the freezer, the product mainly contained boron trifluoride indicating exhaustion of potassium borohydride. The experiment revealed that 4 moles of boron trifluoride reacts completely with 3 moles of potassium borohydride to yield diborane.

Example 9

In this experiment, 21.1 grams potassium borohydride was taken in a 175 ml stainless steel cylinder (reactor cylinder) then closed with a stainless steel diaphragm valve. The cylinder was evacuated and weighed and mounted back on the vacuum manifold. Boron trifluoride 8.2 grams (0.1209 moles) was condensed into this cylinder at liquid nitrogen temperature and was placed in the freezer at —40° C. for a week. The cylinder was taken out of the freezer and mounted at the inlet side of the purifier containing lithium hydroxide. The outlet side of the purifier on the vacuum manifold was connected to a pre-evacuated 175 ml stainless steel cylinder (receiver). The purifier was cooled with dry ice and the receiving cylinder was cooled with liquid nitrogen. The vapor (diborane) from the above cylinder was transferred passing through the purifier and into the cold receiving cylinder. A total of 1.6 grams sample, noted by the weight loss in the reactor cylinder, was transferred. The weight gain of the receiving cylinder was also observed 1.6 grams. The analysis of the sample revealed pure diborane with $CO_2$ impurity less than 10 ppm. The experiment thus shows the efficacy of the purifier in removing carbon dioxide impurity. The purifier in the example would also effectively eliminate any higher boranes.

As the foregoing and other variations and combinations of the features discussed above can be used without departing from the invention as defined by the claims, the foregoing description of preferred embodiments should be taken by way of illustration, rather than by way of limitation, of the invention as defined in the claims.

What is claimed is:

1. A process for producing diborane comprising reacting a reactant including potassium borohydride with a boron trihalide to thereby form a reaction product comprising said diborane, and removing unreacted boron trihalide from said reaction product.

2. A process as claimed in claim 1 wherein said reactant consists essentially of potassium borohydride.

3. A process as claimed in claim 1 wherein said reactant includes potassium borohydride together with sodium borohydride.

4. A process as claimed in claim 1 wherein said reacting step is performed in the absence of a solvent at a reaction temperature of about −130° C. to about 20° C.

5. A process according to claim 1 wherein the boron trihalide is boron trifluoride.

6. A process according to claim 5 wherein said boron trifluoride is present as a liquid in contact with said reactant during at least part of the reaction.

7. A process according to claim 1 wherein the step of removing unreacted boron trihalide from said reaction product comprises using a reagent composition including one or more inorganic hydroxides, to thereby provide purified diborane.

8. A process as claimed in claim 7 further comprising the step of utilizing said purified diborane at a consumption location, said reacting and removing steps being performed at said consumption location.

9. A process as claimed in claim 8 wherein said reacting and removing steps are performed concomitantly with said utilizing step so that diborane is purified and used within about 4 hours after it is formed.

10. A process as claimed in claim 9 wherein diborane is purified immediately after it is formed and used immediately after it is purified.

11. A process for producing diborane comprising reacting an alkali metal borohydride with a boron trihalide to form a reaction product comprising said diborane, and removing unreacted boron trihalide from said reaction produce by contacting said reaction product with a reagent composition including one or more inorganic hydroxides to thereby provide purified diborane.

* * * * *